July 5, 1949.  J. T. MARVIN ET AL  2,475,191

METHOD FOR PRODUCING LATEX FOAM

Filed Jan. 30, 1947  3 Sheets-Sheet 1

INVENTORS
JOHN T. MARVIN &
BY GEORGE H. McFADDEN

July 5, 1949.  J. T. MARVIN ET AL  2,475,191
METHOD FOR PRODUCING LATEX FOAM
Filed Jan. 30, 1947  3 Sheets-Sheet 3

INVENTORS
JOHN T. MARVIN &
BY GEORGE H. McFADDEN

Patented July 5, 1949

2,475,191

UNITED STATES PATENT OFFICE 2,475,191

METHOD FOR PRODUCING LATEX FOAM

John T. Marvin, Dayton, and George H. McFadden, Columbus, Ohio; said Marvin assignor to General Motors Corporation, Detroit, Mich., a corporation of Delaware, and said McFadden assignor to The Ohio State Research Foundation, Columbus, Ohio, a corporation of Ohio Application January 30, 1947, Serial No. 725,379

12 Claims. (Cl. 260—723)

This invention relates to the aeration of viscous liquids and is particularly concerned with improved methods for controlling the aeration of aqueous dispersions of butalastic polymers.

Butalastic polymers are herein defined as any polymer, natural or synthetic which includes a conjugated diene radical such as, butadienes, substituted butadienes, etc.

It is, therefore, an object of the invention to provide a method for aerating aqueous dispersions of butalastic polymers such as, natural rubber or synthetic rubber dispersions or latices into a froth wherein the size of the air bubbles will be controlled and wherein the froth is of a stable character due to controlled beating speed.

In accordance with the above object, it is a further object to provide a continuous method for foaming or frothing aqueous dispersions of butalastic polymers wherein a plurality of beaters are utilized, each of which operates at a progressively different and increased speed whereby the size of the air bubbles in the foam may be closely controlled in the various frothing tanks used in connection with the beaters.

A still further object of the invention is to provide a method for aerating an aqueous dispersion of a butalastic polymer wherein an aqueous dispersion is frothed or foamed through beating operations wherein the beaters operate at progressively greater speeds whereby the bubble size of the dispersion may be controlled and changed through a desirable range of sizes so that the final foamed dispersion will have small sized air bubbles and will be stable in character.

We have discovered that in the frothing or foaming of aqueous dispersions of butalastic polymers such as rubber latex, etc., control of the beater speeds has a marked effect on the type of foam produced. In this connection, it is desirable to create relatively large bubbles in the early stages of the beating which will be gradually reduced in size through the beating process so that small sized bubbles are present in the final foam which tends towards increasing the stability of the foam. Various apparatuses have been used in the past in order to obtain this small bubble size in the foam but so far as we are aware, no satisfactory continuous method has ever been proposed nor have the prior methods been of a type which lend themselves to close control of the foam or to continuous or semi-continuous operation. The present invention is directed to a method and apparatus for foaming aqueous dispersions wherein the bubble size of the foam may be closely controlled and will be progressively decreased with attendant volumetric increase until such time as the foam has the desired bubble size and volume and is of such character that said operations may be carried out in a continuous, semi-continuous or batch process as desired.

Further objects and advantages of the present invention will be apparent from the following description, reference being had to the accompanying drawings wherein preferred embodiments of the present invention are clearly down.

In the foaming or frothing of butalastic polymer dispersions, the froth or foam is produced by aeration of the liquid usually through use of a squirrel cage beater or the like wherein vast quantities of air are introduced into the liquid to produce a foam or froth. This air, as it is beaten into the liquid, tends to produce bubbles of relatively large size and these bubbles are obviously of a rather unstable nature, therefore, if a froth including large bubbles were used in the manufacture of sponge rubber articles, it is apparent that the froth would be highly unstable and would break down in the molds so that completely filled molds would be almost impossible to obtain. It has been found that a relatively small bubble size of the aerated foam has greater stability and is therefore more desirable in the molding of articles from foamed dispersions.

In the past, control of the air bubble size in the foam was difficult to obtain and, so far as we are aware, the only method known was one in which beaters were immersed at different depths within the dispersion whereby different levels of the dispersion was frothed progressively. This method has several obvious disadvantages, the main one being, that the entire batch used in the first beating chamber is only partially aerated at the top thereof.

Our improved method for the aeration of aqueous dispersions proposes the use of a plurality of beaters which operate at progressively increased speeds whereby a large air bubble size is first obtained which bubble size is progressively broken down in the several stages of the process to a controlled small bubble size of a maximum stability.

We have found that a continuous method can be accomplished using our principles of beating wherein a plurality of tanks of varying size are utilized each of which is equipped with a beater wherein the beaters are operated at progressively greater speeds.

For the sake of clarity, the use of the term, latex, hereinafter is to be understood to include any butalastic polymer dispersion, such as; dispersions or latices of natural rubber, polychloroprene, butadiene-styrene copolymers, acrylonitrile, butadiene copolymers, polyisoprene and, in fact, any dispersion which falls within the class of conjugated diolefin-polymers.

Figure 1:
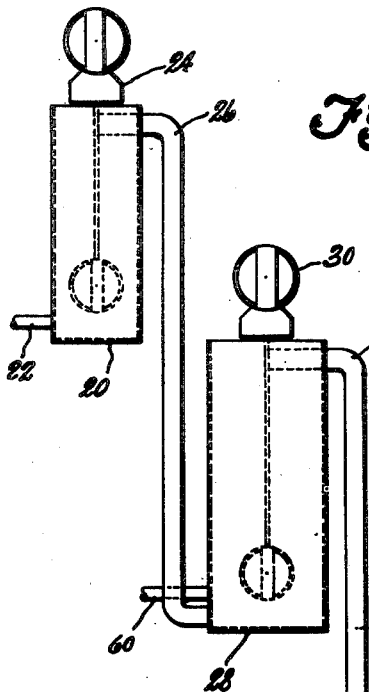
Fig. 1 is a diagrammatic view partly in section of one type of apparatus used in the continuous foaming of rubber latex.

One type of apparatus for such a method is shown in Fig. 1 wherein latex is introduced into a tank 20 through a pipe 22. Tank 20 is equipped with a beater 24 and an outlet duct or chute adjacent the top thereof 26 which connects to the bottom of a second tank 28. Tank 28 is also equipped with a beater 30 and an outlet duct 32 adjacent the top thereof. Tank 28 is connected by chute 32 to the bottom of a third tank 34 which is also equipped with a beater 36. The tank 34 has an outlet duct 38 adjacent the top thereof which empties into the top of a storage tank 40 also equipped with a beater 42. In this connection, we do not care to be limited to three or four tanks or for that matter any number of tanks, since it is apparent that the more progressive stages of beating which occur, the more efficient will be the beating and the breaking up of the foam into bubbles of small size. For commercial reasons, however, 3 to 5 beating tanks are generally sufficient to accomplish the end desired. It will be noted, that the tanks 20, 28, 34 and 40 are progressively greater in size. In this instance, it is apparent that as the latex is aerated or foamed that the foam increases in volume thereby requiring larger tanks in each successive operation. Likewise the beaters 24, 30 and 36 operate at increasingly greater speeds for progressively decreasing the bubble size of the foam. The beater 42 in tank 40 is maintained at the same or slightly slow speed than the beater 36 in tank 34 whereby no further reduction in bubble size occurs in tank 40. This tank is merely used as a storage tank from which frothed latex may be removed through the pipe or chute 44 by manipulation of valves 46. Thus relatively small quantities of foamed latex are conducted to tank 48 which is of relatively small size and which is equipped with beater 50 preferably operating at a speed greater than the beater 42. Gelling agent is introduced into the foamed latex in this tank through a pipe 52 when the foamed latex with the gelling agent therein is drawn off through valved pipe 54 into the molds (not shown). Through the use of the large storage tank 40, it is possible to permit the output of the apparatus to be continuous whereby intermittent withdrawals can be made as is required for the filling of molds. Likewise it will be apparent that only a small quantity of the latex foam has the gelling agent added and the quantity of this foam is only sufficient to fill the molds on hand. The large tank 40 takes up the continual output of the apparatus and acts somewhat as a storage take-up whereby the intermittent filling of the molds does not interrupt the continuous operation of the main apparatus. Inlets 60 and 62 are provided as means for introducing compounding ingredients, if desired, at various stages of the process although this compounding may be done prior to foaming or in any one tank.

Figure 1A:
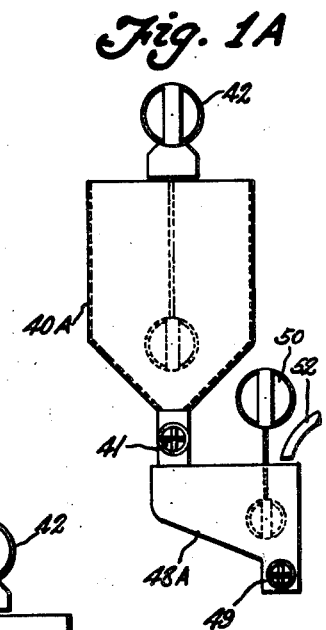
Fig. 1A is a view of another embodiment of tank design to be used in the last two steps of Fig. 1.

Fig. 1A shows another embodiment of the last two tanks wherein storage tank 40a has a bottom draw-off 41 into gelling tank 48a which is also equipped with a bottom draw-off 49.

Figure 2:
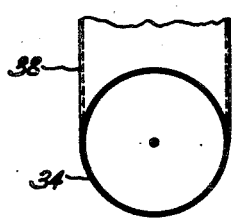
Fig. 2 is a section taken on line 2—2 of Fig. 1 showing the drain-off chute used in connection with the various tanks.
Figure 3:
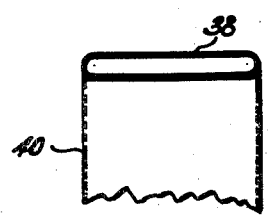
Fig. 3 is a view taken in section on line 3—3 of Fig. 1, showing the cross-sectional view of the drain-off chute.

In actual operation, latex is fed into tank 20 through pipe 22 where it is beaten into a large bubble froth by beater 24 which causes the latex to increase in volume (the increase in the first tank is small) and run over through the chute 26 which is of large cross sectional area as noted in Figs. 2 and 3. The bottom of tank 20 is above the top of tank 28 whereby gravity and overflowing latex creates sufficient pressure to introduce the frothed latex into tank 28 where it is beaten at a greater speed for reducing the bubble size and likewise for increasing the volume whereby the foam over-flows through chute 32 into the tank 34 etc. Pipes 60 and 62 are provided in tanks 28 and 34, or in any of the other tanks and are utilized to introduce various compounding ingredients into the mixture during the foaming operation as desired.

In this process, in some cases, it may be desirable to limit the speed of beater 42 in tank 40 to a speed slightly less than the speed of beater 36 whereby no additional foaming is obtained in the storage tank 40. Any drop in foam will be readily reinstated by the higher speed of the beater 50 in the small batch tank 48.

It is also manifest that while Fig. 1 shows only 3 tanks prior to the storage tank with three beaters of progressively greater speeds, that four, five or ten or more steps may be utilized in order to produce the desired bubble size foam. The number of beaters or tanks will be limited only by the type of foam desired and the economics of the set-up.

Figure 4:
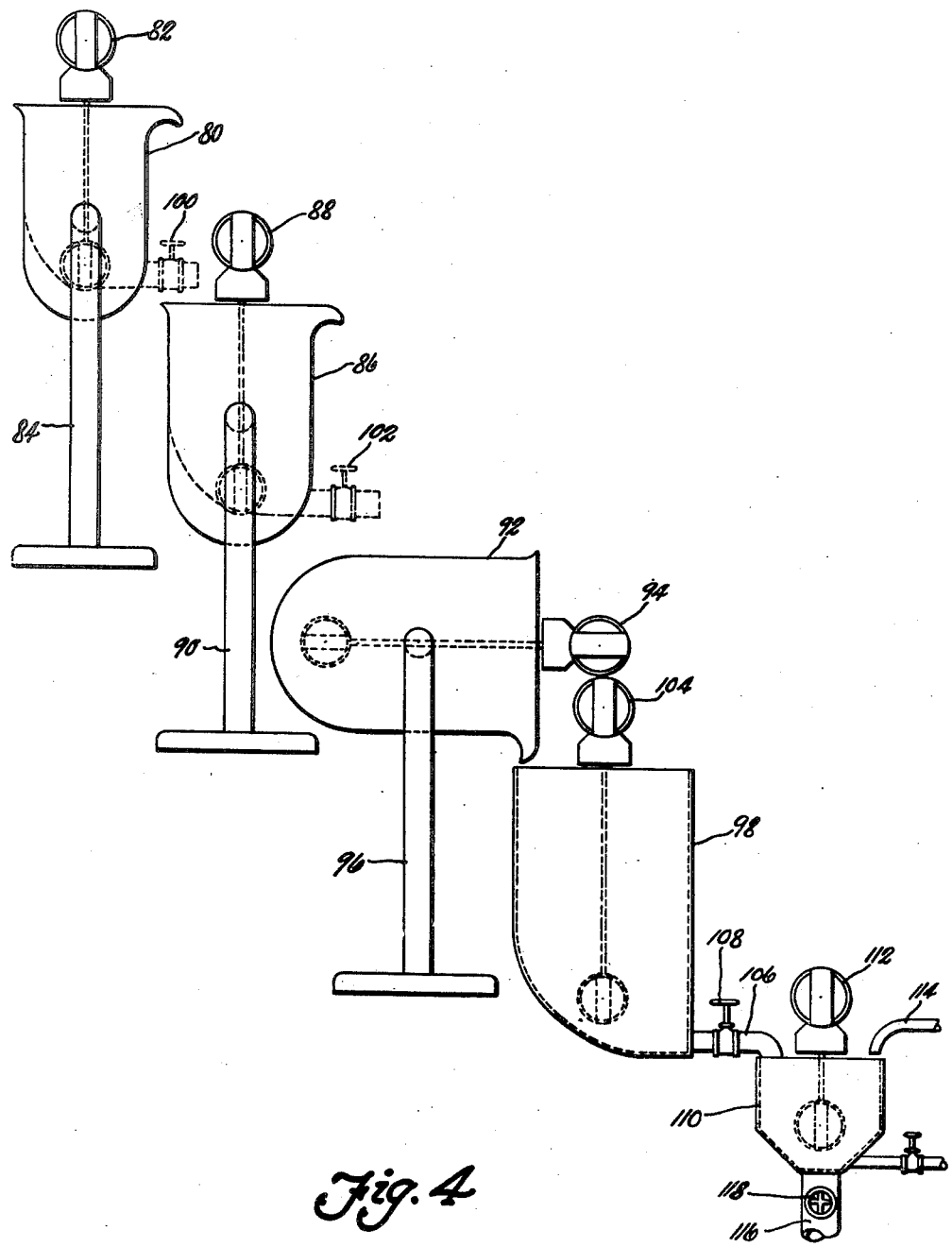
Fig. 4 is a diagrammatic view of another type of apparatus for continuous or semi-continuous foaming of aqueous dispersions.

Another embodiment of the invention is shown in Fig. 4 wherein another type of apparatus is utilized to accomplish the same end, namely that of foaming the latex. In Fig. 4 a plurality of tanks are shown wherein tank 80 is the initial mixing chamber for the latex. The latex may or may not be compounded as desired or it may be compounded by the addition of compounding ingredients at any of the subsequent steps in the process. The tank 80 is supplied with a mixer 82 and is preferably tiltably supported on a support 84. After a predetermined time of mixing, during which period air is beaten into the latex to form large bubbles, the tank 80 is tilted on the support 84 and the contents poured into a second tank 86 also supplied with a mixer or beater 88. Tank 86 is tiltably supported on support 90. After another period of aeration, the tank 86 is tilted to pour its contents into a third tank 92 supplied with a mixer 94 and tiltably supported on support 96. Tank 92 in the drawing, Fig. 4, is shown in a tilted position wherein the contents is being poured into storage tank 98. In place of tilting tanks, valved bottom outlets may be supplied for the tanks as shown in the dotted lines at 100 and 102 in connection with tanks 80 and 86. In this case, the beaten latex is removed from the bottom of the tanks rather than being poured therefrom. Obviously any means of transferring the latex from one tank to the other comes within the scope of this invention.

Storage tank 98 is analogous to tank 40 shown in Fig. 1 and is larger than any of the other tanks. Tank 98 is also supplied with a beater 104 and a bottom outlet 106 which is valved at 108 and communicates with a smaller tank 110 also equipped with a beater 112 wherein the gelling agent may be added through a pipe 114. The tank 110 may be emptied directly into molds through a bottom outlet 116 which is valved at 118 or by other suitable means.

In practice, squirrel cage type beaters are utilized which operate on a planetary system. One such beater is sold on the market under the name of "Hobart mixer" which is a planetary type mixer having a planetary rotation of about ½ the speed of the rotation of the beater. In one example, the beater in tank 80 will operate at about 100 R. P. M. with 50 R. P. M. planetary rotation whereas the beater 88 in tank 86 will be operated at approximately 200 R. P. M. with a 100 R. P. M. planetary rotation whereas the beater 94 in tank 92 will be operated at approximately 400 R. P. M. with between 150 and 200 R. P. M. planetary rotational speed. In this connection, the beater in the storage tank is preferably operated at a speed slightly less than the last foaming tank beater to prevent further increase in foam volume and, therefore, we recommend speeds between 350 and 375 R. P. M. with a corresponding planetary rotational speed. The beater 112 in the tank 110 operates at a speed the same or slightly greater than the last foaming tank beater speed and, in this connection, the beater 112 should operate around 400-425 R. P. M.

The first beater step conditions the latex for foaming by "creaming" the dispersion. This does not create a marked increase in volume and nothing approximating the increase experienced in the last two tanks.

It will be noted that the tanks 80, 86 and 92 are of progressively larger size to take care of the increased volume of the latex as it becomes aerated. Each successive tank should be approximately two times the volume of the preceding tank when three chambers are utilized with the above beater speeds, and in this connection, the final storage tank 98 should be about twice as large as the last aerating tank. The size of the gelling tank 110 is controlled by the number of molds which are desired to be filled from one batch of the latex.

All of the speeds noted herein and suggested volumes of tanks are obviously arbitrary and depend very much on the number of steps utilized. The suggested size ratio of tanks and speed of beaters therein, is given for a three stage process. We have found that the latex will not increase very greatly in volume during the beating in tank 80 wherein the latex is beaten at a rather slow speed, which beating may be called the "creamink" step. Thus the tank 80 may be charged about three quarters full. The latex, after being transferred to tank 86, will increase two times its original volume and, therefore, tank 86 should be about twice the size of tank 80 to accommodate this change. Tank 92, after being transferred will again increase about twice its volume so this tank should be about twice as large as the preceding tank 86 etc. As herebefore stated the number of beating steps and progressive increase in beating speeds has much to do with the volume increase in the various tanks and, therefore, the figures given are illustrative only of a three step process at approximately the beating speeds set forth.

This tremendous change in volume due to aeration of the latex, is one of the controlling factors for the success of this invention. By using successive tanks of increasing size, it is possible for the beaters to operate at substantially full efficiency, in all cases, since the level of the latex initially charged is always approximately the same due to the changing volume of the tanks. This is one fact which makes the beating of latex by means of a variable speed beater in a single tank rather difficult to accomplish and inefficient since the tank must be large enough to hold the final volume of the latex and thus only a very small quantity may be charged therein which means that the beater is not operating at anything approximating its full efficiency until the volume of the latex has greatly increased due to aeration. This requires longer times for the mixing which, often causes premature coagulation of the latex, or a runny condition thereof wherein frothing is difficult to obtain. Similarly if the latex is beaten at the high speed first, premature coagulation may possibly result whereas the gradual increase in beating speeds used in the present invention prevents any such contingency from arising.

It is obvious from these statements that the more tanks utilized in the steps of beating, the greater the efficiency of the set-up since the change in volume in each tank will be relatively less which means that the beater will be operating in a more constant depth of liquid or froth which is a desirable condition. However, for practical purposes in production, three beater chambers or tanks yield satisfactory results, as set forth herein.

Figure 5:
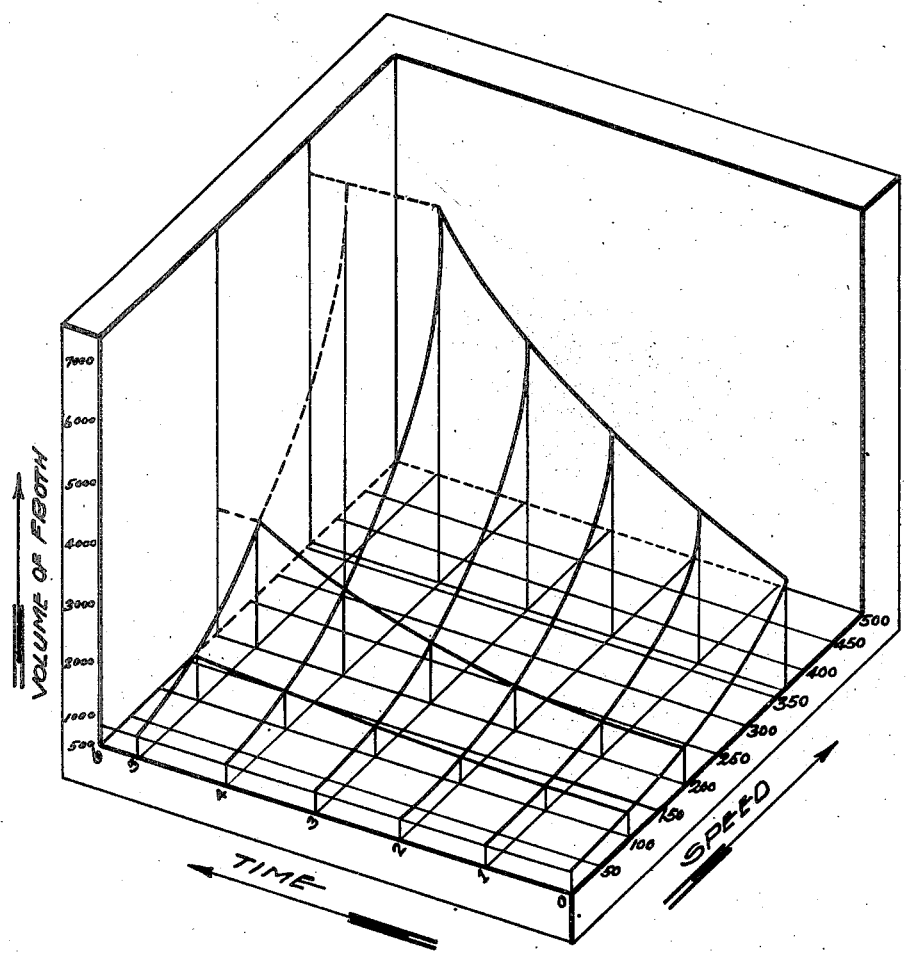
Fig. 5 is a three dimensional chart showing effect of speed and time on foam height.

Fig. 5 is a three dimensional chart showing actual results obtained in beating latex to a foam in a three step process, the speeds utilized being approximately 100, 200 and 360 R. P. M. The chart shows that the latex is first beaten for six minutes at 100 R. P. M., the speed is then increased to 200 R. P. M. for a period of five minutes after which the same frothed latex is beaten at 360 R. P. M. for four minutes. Thus the actual foaming of the latex takes place over a period of 15 minutes during which time the volume thereof increases approximately seven times. The foam obtained is highly stable, of small bubble size and very desirable for molding purposes.

From the foregoing it is apparent we have provided a new method for continuously foaming butalastic copolymers in aqueous dispersions which gives a desirable foam of stable characteristics, small bubble size, which method through the specific steps used in the process is highly efficient throughout the beating periods whereby greater quantities of dispersions may be frothed to a desirable character foam in a minimum of time. It should be understood that the process disclosed herein may be operated intermittently if desired and that their success is not dependent on continuous operation.

In some cases it may be desirable to furnish air or other satisfactory gaseous medium under pressure to one or more of the beating chambers to aid in the aeration of the latex and thus work in conjunction with the beater or beaters, such an expedient is understood to be within the scope of our invention.

While the embodiments of the present invention as herein disclosed, constitute preferred forms, it is to be understood that other forms might be adopted, all coming within the scope of the claims which follow.

What is claimed is as follows:

1. A method of foaming viscous liquid taken from the class consisting of butalastic latices and dispersions, the steps of; beating the liquid for a given time at a given speed in the order of 100 R. P. M.; for aerating the liquid and for producing bubbles therein, and then progressively beating the liquid at increased speeds for given periods of time until a speed of about 400 R. P. M. is reached whereby the bubble size of the liquid is progressively reduced, while the aeration of the liquid is progressively increased for forming a highly stable foam having the desired physical characteristics.

2. In the method of foaming latex the steps of, progressively beating latex in a plurality of stages wherein the latex is beaten at a progressively increased speed at each successive stage in a ratio of from 1 to 4 in the extreme stage wherein the top speed is in the neighborhood of 400 R. P. M. whereby the bubble size of the latex froth is progressively decreased while the aeration of the latex is progressively increased for forming a froth of high stable character and with relatively small bubbles.

3. The steps of foaming an aqueous dispersion comprising; beating the dispersion at a constant speed in the order of 100 R. P. M.; for a given period of time for forming a froth having a relatively large bubble size, beating the dispersion at a greater speed for a given period of time for breaking down the bubble size to a relatively smaller bubble size and finally beating the dispersion at a still greater speed of about four times the initial speed for breaking the bubble size down to an even smaller bubble size whereby the stability and volume of the foam is increased and the physical characteristics thereof are controlled.

4. In a continuous process of foaming latex and aqueous dispersions of butalastics, the steps comprising; continuously supplying latex to a container, beating the latex for aerating the same wherein the beating takes place at a relatively low speed in the order of 100 R. P. M.; for forming a relatively large bubble and increasing the volume of the latex, continuously removing a portion of said froth latex to a second container wherein it is beaten at a relatively greater speed in the order of 200 R. P. M. for breaking the bubble size down to a smaller size and for again increasing the volume of the latex, continuously removing frothed latex from the second container and supplying same to a third container wherein the latex froth is beaten at a relatively greater speed and in the order of 400 R. P. M. for further breaking down the bubble size and for further increasing the volume of the latex froth.

5. The method as claimed in claim 4, including the added step of continuously withdrawing the froth from the last container into a supply tank wherein it is beaten at a speed not in excess of the speed utilized in the last container, and then removing portions of this latex froth and supplying same to a mixing tank, beating the froth in the mixing tank at a speed in excess of the speed utilized in the last container and simultaneously supplying gelling agent therethrough, and finally supplying this froth to a mold.

6. The steps in the method of frothing latex and aqueous dispersions of butalastic materials comprising; beating latex at an initial relatively slow speed of about 100 R. P. M. and then progressively increasing the speed to a speed of about 400 R. P. M. for foaming the latex and for progressively decreasing the bubble size thereof while progressively increasing the volume of the latex to a point where a stable froth is formed having the desired physical characteristics.

7. The steps in the continuous method of frothing latex comprising; supplying latex to a tank, beating the latex in the tank at a relatively slow speed in the order of 100 R. P. M. for aerating the same by the formation of relatively large bubbles therein, and removing at least a portion of said latex froth and beating the same in a second tank at a relatively greater speed than the speed utilized in the first tank for breaking down the bubble size and for increasing the aeration of the froth said speeds varying in the ratio of about from 1 to 4.

8. In the continuous method of frothing latex in a plurality of stages, the steps of; beating latex in one stage in a container at about 100 R. P. M. to form a large bubble, low stability foam, transferring at least a portion of said foam into another container in another stage, beating it at a speed about twice the initial speed for forming a relatively small bubble foam of greater stability than the stability of the foam formed in the first mentioned container, and then at last beating said foam in a third stage at a speed of about four times the initial speed for increasing the stability of the foam through reduction in bubble size therein.

9. A method of aerating latex, comprising the steps of; initially beating latex with a beater at a speed sufficient to cream the latex and thereby increase its volume by the inclusion of relatively large air bubbles therein, transferring the creamed latex to another container and beating it with a second beater rotating at a speed greater than the speed of the first beater for reducing the bubble size and for further increasing the volume of the foam, and finally transferring the foam to a third container wherein it is beaten at a still greater speed for reducing the bubble size of the foam and for further extending the foam to a volume whereby the final volume of the latex foam is at least five times the volume of the initial latex used in the first container said beating speeds varying progressively from about 100 R. P. M. to 400 R. P. M.

10. In a continuous method of aerating latex, the steps comprising; providing a plurality of containers of progressively increasing size, providing each container with a beater therein which is operated at a progressively increased speed over the speed of the preceding beater, arranging said containers so that the bottom of the first container is disposed in a plane at least equal to the top of the next succeeding container, connecting the containers by means of conduits leading from the top of one container to the bottom of the next container, charging latex in the first container, beating the charged latex for increasing the volume thereof and for causing the latex to overflow into the second container whereby a continuous flow of latex is provided throughout the system due to the ever-increasing volume of the latex foam in progressive stages of operation said beating speeds varying progressively from about 100 R. P. M. to 400 R. P. M.

11. The steps in the method of frothing latex comprising; supplying latex to a container, beating latex at a speed and for a time sufficient to increase the volume of the latex through aeration to at least one and one-quarter times its initial volume, transferring the latex to a second container where it is beaten at a speed approximately double the speed used in the first container for a time sufficient to increase the volume of latex foam in said second container at least two times of the volume of the foam initially charged therein, and finally transferring the latex to another container and beating the same at a speed sufficient to cause the latex foam to expand to a point at least five times the volume of the latex initially charged into the first container said beating speeds varying progressively from about 100 R. P. M. to 400 R. P. M.

12. In a method for increasing the efficiency of foaming operations on latex materials, the steps comprising; beating latex with beaters in a plurality of stages at progressively increasing speeds said speeds progressively increasing from an initial speed of about 100 R. P. M. to a final speed in the neighborhood of 400 R. P. M., simultaneously transferring the foamed latex from one stage to the next as its volume increases a predetermined amount, whereby the beating operation in each stage is maintained at its maximum efficiency through optimum immersion of beater elements utilized in the beating operation.

JOHN T. MARVIN.
GEORGE H. McFADDEN.

REFERENCES CITED

The following references are of record in the file of this patent:

UNITED STATES PATENTS

| Number | Name | Date |
| --- | --- | --- |
| 1,584,126 | North | May 11, 1926 |
| 2,244,616 | Greenup | June 3, 1941 |
| 2,295,740 | Keen | Sept. 15, 1942 |
| 2,307,082 | Grothenhuis | Jan. 5, 1943 |
| 2,324,988 | Greenup | July 20, 1943 |